US 6,669,859 B1

(12) United States Patent
Tiesler

(10) Patent No.: US 6,669,859 B1
(45) Date of Patent: Dec. 30, 2003

(54) INVERTED SUN VISOR MIRROR ASSEMBLY

(75) Inventor: John M. Tiesler, Harrison Township, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/248,416

(22) Filed: Jan. 17, 2003

(51) Int. Cl.[7] ................................................. B60J 3/00
(52) U.S. Cl. ..................... 216/97.5; 16/297; 16/334
(58) Field of Search ........................ 296/97.2, 97.5, 296/97.12, 97.13; 16/297, 332, 334

(56) References Cited

U.S. PATENT DOCUMENTS

| | | | |
|---|---|---|---|
| 695,161 A | * | 3/1902 | Linkert |
| 753,985 A | * | 3/1904 | Kirby, Jr. |
| 938,952 A | * | 11/1909 | Berg |
| 4,477,199 A | * | 10/1984 | Manzoni ................... 16/332 |
| 4,740,028 A | | 4/1988 | Connor ................... 296/97 H |
| 4,882,807 A | * | 11/1989 | Frye et al. ................... 16/334 |
| 5,340,186 A | | 8/1994 | Aymerich et al. ........... 296/97.1 |
| 5,355,254 A | | 10/1994 | Aymerich et al. ............ 359/844 |
| 5,374,097 A | | 12/1994 | George et al. .............. 296/97.5 |
| 5,442,530 A | * | 8/1995 | Viertel et al. ............... 296/97.5 |
| 5,576,898 A | * | 11/1996 | Rubin ........................ 296/97.2 |
| 5,938,165 A | | 8/1999 | Hartmann et al. ........... 248/466 |
| 5,975,708 A | * | 11/1999 | Fitzpatrick et al. ......... 296/97.5 |
| 6,099,066 A | | 8/2000 | Corn ........................ 296/97.11 |
| 6,203,161 B1 | * | 3/2001 | Busch et al. ................ 296/97.5 |
| 6,263,543 B1 | * | 7/2001 | Daoud ........................... 16/334 |

FOREIGN PATENT DOCUMENTS

| | | | | |
|---|---|---|---|---|
| DE | 4315582 | * | 11/1994 | ................ 296/97.2 |
| JP | 2-127123 | * | 5/1990 | ................ 296/97.2 |

* cited by examiner

Primary Examiner—D. Glenn Dayoan
Assistant Examiner—H. Gutman
(74) Attorney, Agent, or Firm—Bill C. Panagos

(57) ABSTRACT

There is provided an inverted sun visor mirror assembly which can be mounted in an automotive sun visor such that it may be opened and used without the necessity of lowering the sun visor to a down position. Provision for a courtesy light is also provided.

16 Claims, 3 Drawing Sheets

INVERTED SUN VISOR MIRROR ASSEMBLY

BACKGROUND OF INVENTION

1. Field of the Invention

The present invention generally relates to sun visor mirrors for use in automobiles and particularly to a sun visor mirror which may be used while the sun visor is in the up or storage position.

2. Description of the Related Art

It is well known that automobile sun visors are provided as original equipment with a mirror which is usually known as a vanity mirror. The vanity mirror may be simply superimposed on the sun visor or it may be integrated in the sun visor structure. The vanity mirrors integrated into the sun visor structure comprise in general essentially a boxlike shell and a cover plate. The boxlike shell of the vanity mirror is basically prismatic in shape and is open on the front surface thereof, the boxlike shell being dimensioned to contain the mirrored surface as well as other devices related with the functionality of the vanity mirror. The vanity mirror cover plate is attached to the boxlike shell and may be operated at will by the user so that the latter may conceal the mirrored surface or open it to view.

However, the vanity mirrors as described above and in the following references generally have a number of drawbacks. One of the most important being the inability of the user to access the vanity mirror when the sun visor is in the up or storage position. Another is the inability of the user to position the vanity mirror at a desired angle for ease of use.

For example, U.S. Pat. No. 4,740,028 issued Apr. 26, 1988 to Connor teaches a fold out mirror on a sun visor where the sun visor must be in the down or user position to allow use of the mirror.

U.S. Pat. No. 5,340,186 issued Aug. 23, 1994 to Aymerich et al teaches. an attachment method and means for permanently attaching a mirror frame to the upper surface of a sun visor requiring the lowering of the sun visor before the mirror may be used.

U.S. Pat. No. 5,355,254 issued Oct. 11, 1994 to Aymerich et al teaches a means of holding open a sun visor mirror cover utilizing a pair of springs. Again however, the sun visor must be in the down position to use the mirror.

U.S. Pat. No. 5,374,097 issued Dec. 20, 1994 to George et al teaches a sun visor mounting system that may be used to attach a sun visor to an automobile. The mounting device taught also includes a mirror and mirror cover that requires the sun visor to be in a down position to be available for use.

U.S. Pat. No. 5,938,165 issued Aug. 17, 1999 to Hartmann et al. teaches a clip on device which may hold a mirror and is intended to be clipped onto a sun visor.

U.S. Pat. No. 6,099,066 issued Aug. 8, 2000to Corn teaches a motorized sun visor support and positioning system and also incorporating a mirror cut-out area for the permanent mounting of a mirror to the upper surface of the sun visor.

DISCLOSURE OF THE INVENTION

The present invention provides advantages and alternatives over the prior art by providing an inverted sun visor mirror assembly which allows for the use of a courtesy mirror in an automotive vehicle without the need to lower the sun visor to use the courtesy mirror.

According to a further aspect of the present invention, there is provided a sun visor mirror assembly which provides for a less restricted vision area through the windshield of an automotive vehicle when said sun visor mirror is in use.

According to another aspect of the present invention, there is provided a sun visor mirror assembly for mounting within a mating recess in the downward facing surface of a sun visor when said sun visor is in an up storage position allowing use of the mirror without lowering the sun visor. Said mirror assembly comprises a sun visor insert frame dimensioned to house a mirror mounting frame moveably attached along one edge to one edge of said sun visor insert frame by, a plurality of detent hinge assemblies. Each of said detent hinge assemblies comprises a detent hinge plate having detent lobes and a bore for moveably connecting a mating goose neck bracket having an integral hinge pin through the bore of said detent hinge plate, a return spring mounted on said integral hinge pin, and a spring clip having a node thereon to engage the detent lobes of the detent hinge plate, as well as a mirror permanently attached to said mirror mounting frame by a permanent attaching means. Said sun visor mirror assembly is mounted by a permanent attaching means in said mating recess in the downward facing surface of said sun visor.

In still another aspect of the present invention, there is provided a sun visor mirror assembly for mounting within a mating recess in the downward facing surface of a sun visor when said sun visor is in an up storage position allowing use of the mirror without lowering the sun visor. Said mirror assembly comprises a sun visor insert frame, having a courtesy light assembly bracket, dimensioned to house a mirror mounting frame moveably attached along one edge to one edge of said sun visor insert frame by, a plurality of detent hinge assemblies. Each said assembly comprises a detent hinge plate having detent lobes and a bore for moveably connecting a mating goose neck bracket having an integral hinge pin through the bore of said detent hinge plate, a return spring mounted on said integral hinge pin, and a spring clip having a node thereon to engage the detent lobes of the detent hinge plate, as well as a mirror permanently attached to said mirror mounting frame by a permanent attaching means. Said sun visor insert frame, courtesy light assembly bracket and the detent hinge plates are injection molded as a single unit, and said mirror mounting frame and the goose neck bracket hinge plates are injection molded as another single unit. Said sun visor mirror assembly is mounted by a permanent attaching means in said mating recess in the downward facing surface of said sun visor.

DETAILED DESCRIPTION

Figure 1:
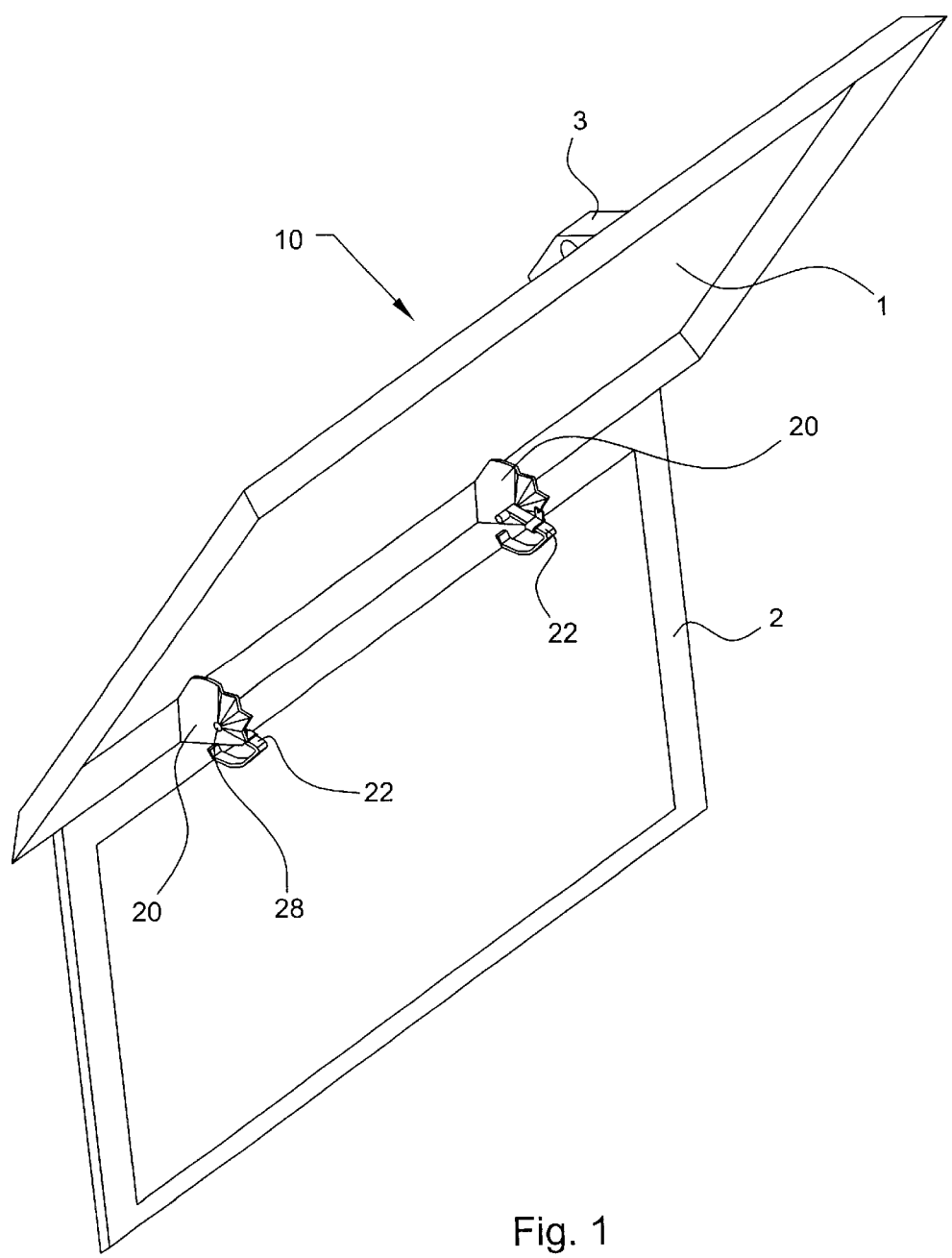
FIG. 1 shows a perspective view of a preferred embodiment of the inverted sun visor mirror assembly of the present invention.

Reference will now be made to the drawings, wherein to the extent possible like reference numerals are utilized to designate like components throughout the various views.

Referring to FIG. 1, which presents a perspective view of a preferred embodiment of the inverted sun visor mirror assembly 10 comprising a sun visor insert frame 1 and a mirror mounting frame 2 connected in hinged relationship by detent hinge assemblies 20 showing goose neck brackets 22 and detent hinge plate bore 28. Also disclosed is a courtesy light housing 3 integrally formed as part of sun visor insert frame 1. The mirror mounting frame 2 provides a mounting support for a courtesy mirror not shown. It is to be understood that the courtesy light housing 3 will have mounted therein a light source, associated electrical connection means and on/off switch means as are well known in the art.

It is to be understood that the courtesy light housing 3 may alternatively be a separate unit fixedly attached to sun visor insert frame 1 by known attachment means. Likewise, detent hinge assemblies 20 may alternatively be a separate assembly fixedly attached to both sun visor insert frame 1 and mirror mounting frame 2. In addition, a portion of detent hinge assemblies 20 may be an integral part of sun visor insert frame 1, and another mating portion of detent hinge assemblies 20 may be an integral part of mirror mounting frame 2.

The composition of the various members of the inverted sun visor mirror assembly may be of any known material suitable for use for such vehicle parts, preferably it is composed of molded plastic, and most preferably the sun visor insert frame is composed of polycarbonate acrylonitrile-butadiene styrene (PC ABS) and the mirror mounting frame is preferably composed of high crystalline polypropylene (HCPP). The sun visor insert frame and the mirror mounting frame are preferably molded to have a thickness of preferably 2.5 mm.

Figure 2:
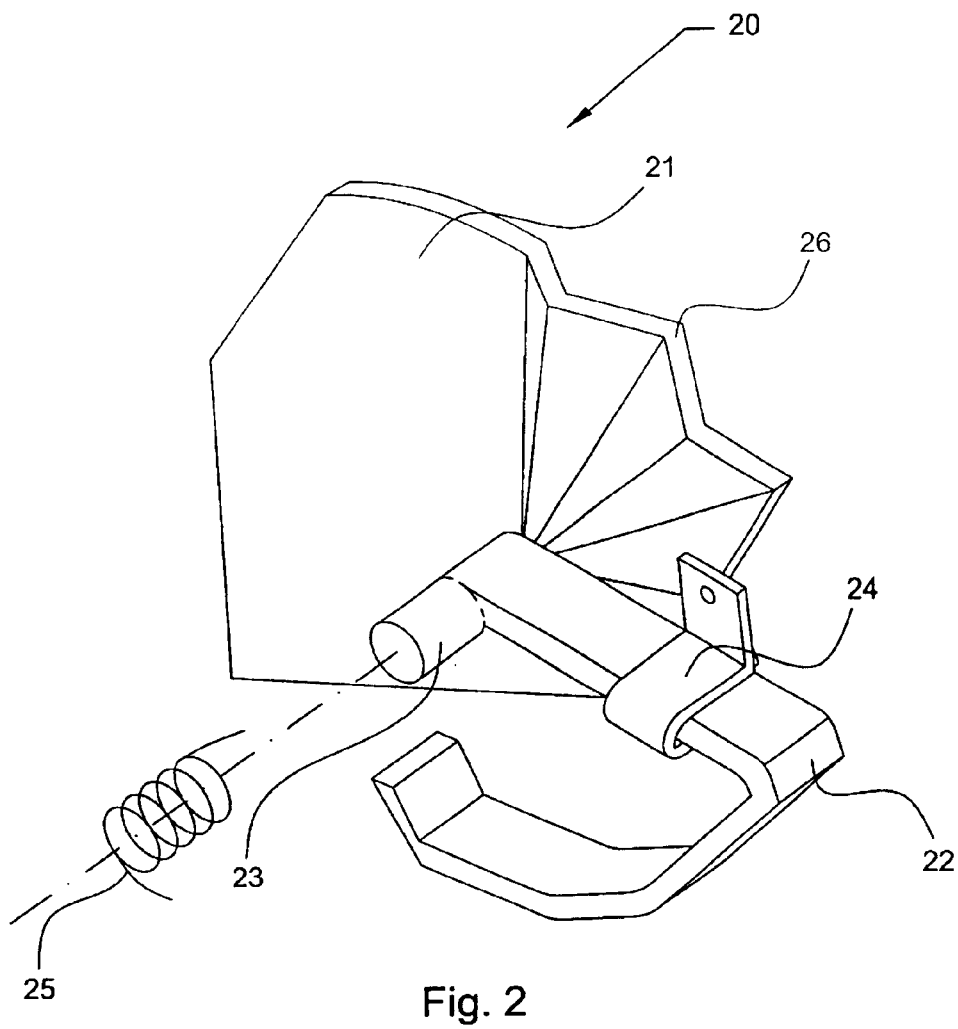
FIG. 2 shows an exploded view of the detent hinge of the inverted sun visor mirror of the present invention.

Referring now to FIG. 2 there is shown an exploded close-up view of the detent hinge assembly 20 comprising a detent hinge plate 21 having detent lobes 26 on at least a portion of said detent hinge plate 21 and a bore 28 for receiving a hinge connecting pin 23 of goose neck hinge bracket 22. Also shown is a mating goose neck hinge bracket 22 pivotally mounted to detent hinge plate 21 by an integral hinge pin 23 through detent hinge plate bore 28 and detent spring clip 24 mounted on said mating goose neck hinge bracket 22 and having a node 27 (FIG. 4) located thereon such that said node 27 (FIG. 4) engages detent lobes 26. Also shown is return spring 25 which is mounted on hinge pin 23 when assembled. Said return spring 25 holding the mirror mounting frame 2 and mounted mirror (not shown) in a closed position when not in use.

Detent spring clip 24 and return spring 25 are constructed of materials well known in the art for these types of devices. Preferably the spring clip 24 comprises spring steel and most preferably 0.5 mm thick spring steel.

Figure 3:
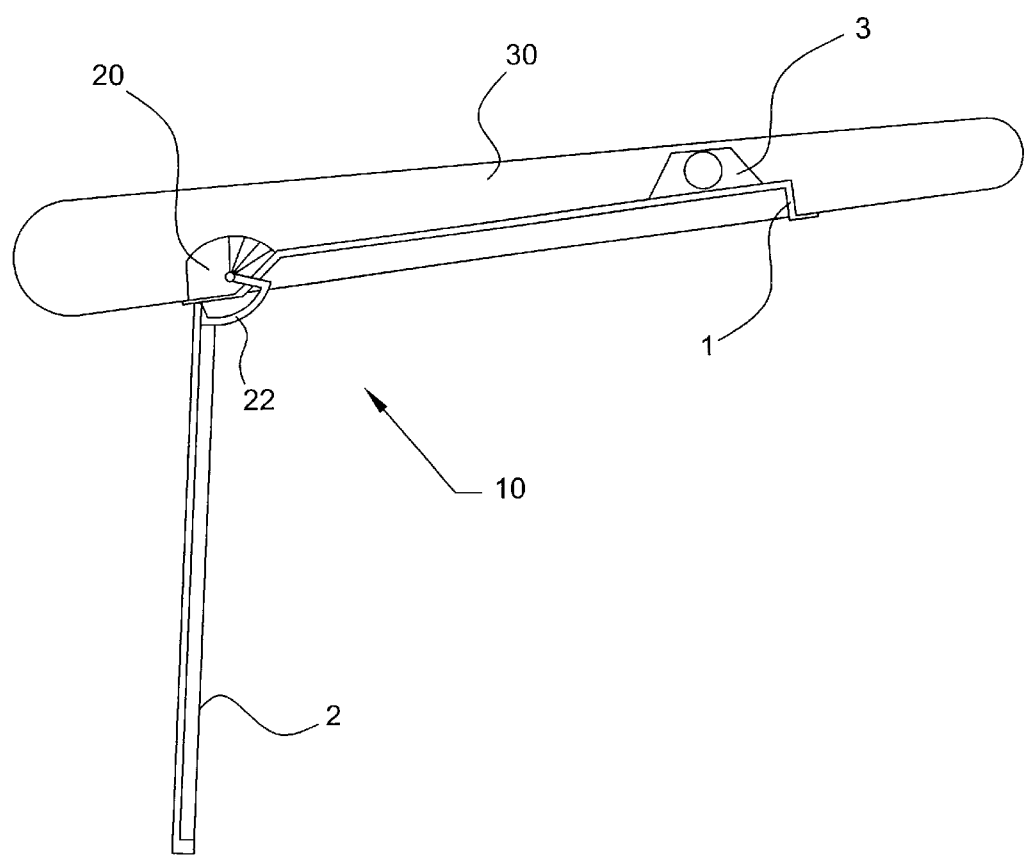
FIG. 3 shows sectional view of the inverted sun visor mirror of the present invention mounted on a sun visor.

Turning now to FIG. 3 there is shown a sectional view of a typical vehicle sun visor 30 having the inverted sun visor mirror assembly 10 mounted therein showing the placement and mounting of sun visor insert frame 1 having a courtesy light mounting bracket 3 and mirror mounting frame 2 in an open position having mirror support brackets 22 connected thereto. Also shown is detent hinge assembly 20.

Figure 4:
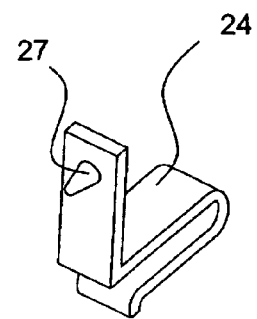
FIG. 4 shows a perspective view of the spring clip of the present invention.

FIG. 4 shows a perspective view of the detent spring clip 24 with node 27 mounted therein. The node 27 comprises a material that will not wear the detent lobes 26 unnecessarily, such materials and material compatibility being well known in the art.

The present invention thus advantageously provides a useful, convenient sun visor courtesy mirror which does not require the sun visor be in a down position to allow use of the mirror.

Although the preferred embodiments of the present invention has been disclosed, various changes and modifications may be made without departing from the scope of the invention as set forth in the appended claims.

What is claimed is:

1. A sun visor assembly for mounting a mirror within a mating recess in the downward facing surface of a sun visor when said sun visor is in an up storage position allowing use of the mirror without lowering the sun visor, said sun visor assembly comprising:
   a sun visor insert frame dimensioned to accept a mirror mounting frame moveably attached along one edge to one edge of said sun visor insert frame by
      a plurality of detent hinge assemblies each comprising:
         a detent hinge plate having detent lobes and a bore for moveably connecting
         a mating goose neck bracket having an integral hinge pin through the bore of said detent hinge plate, a return spring mounted on said integral hinge pin, and a spring clip having a node thereon to engage the detent lobes of the detent hinge plate, and
   said sun visor assembly being permanently mounted in said mating recess in the downward facing surface of said sun visor.

2. The sun visor assembly as claimed in claim 1 wherein said plurality of detent hinge assemblies comprises two of said detent hinge assemblies.

3. The sun visor mirror assembly as claimed in claim 1 wherein said sun visor insert frame also comprises a courtesy light housing.

4. The sun visor mirror assembly as claimed in claim 1 wherein said sun visor insert frame and said detent hinge plates are a single integral unit, and said mirror mounting frame and said goose neck bracket are a single integral unit.

5. The sun visor mirror assembly as claimed in claim 1 wherein said sun visor insert frame comprises polycarbonate acrylonitrile-butadiene styrene and said mirror mounting frame comprises high crystalline polypropylene.

6. The sun visor mirror assembly as claimed in claim 1 wherein said courtesy light housing is a separate unit fixedly mounted to said sun visor insert frame.

7. The sun visor mirror assembly as claimed in claim 1 wherein said sun visor insert frame and said mirror mounting frame comprise the same material.

8. The sun visor mirror assembly as claimed in claim 1 wherein said spring clip comprises spring steel, preferably 0.5 mm thick spring steel.

9. The sun visor mirror assembly as claimed in claim 1 wherein said node comprises polycarbonate acrylonitrile-butadiene styrene.

10. A sun visor assembly for mounting a mirror within a mating recess in the downward facing surface of a sun visor when said sun visor is in an up storage position allowing use of the mirror without lowering the sun visor, said sun visor assembly comprising:
   a sun visor insert frame having a courtesy light housing dimensioned to accept a mirror mounting frame moveably attached along one edge to one edge of said sun visor insert frame by
      a plurality of detent hinge assemblies each comprising:
         a detent hinge plate having detent lobes and a bore for moveably connecting
         a mating goose neck bracket having an integral hinge pin through the bore of said detent hinge plate, a return spring mounted on said integral hinge pin, and a spring clip having a node thereon to engage the detent lobes of the detent hinge plate, and wherein said sun visor insert frame, courtesy light housing and the detent hinge plates are a single unit, and said mirror mounting frame and the goose neck brackets are another single unit, and said sun visor assembly being permanently mounted in said mating recess in said downward facing surface of said sun visor.

11. The sun visor mirror assembly as claimed in claim 10 wherein said sun visor insert frame comprises polycarbonate acrylonitrile-butadiene styrene and said mirror mounting frame comprises high crystalline polypropylene.

12. The sun visor mirror assembly as claimed in claim 10 wherein said sun visor insert frame and said mirror mounting frame comprise the same material.

13. The sun visor mirror assembly as claimed in claim 10 wherein said spring clip node comprises spring steel, preferably 0.5 mm thick spring steel.

14. The sun visor mirror assembly as claimed in claim 10 wherein said node comprises polycarbonate acrylonitrile-butadiene styrene.

15. The sun visor mirror assembly as claimed in claim 1 wherein said sun visor insert frame and said mirror mounting frame each have a wall thickness of 2.5 mm.

16. The sun visor mirror assembly as claimed in claim 10 wherein said sun visor insert frame and said mirror mounting frame each have a wall thickness of 2.5 mm.

* * * * *